(12) United States Patent
Tsukuda et al.

(10) Patent No.: US 6,562,505 B1
(45) Date of Patent: May 13, 2003

(54) SEALING STRUCTURE OF CELL TUBE

(75) Inventors: Hiroshi Tsukuda, Nagasaki (JP);
Nagao Hisatome, Nagasaki (JP);
Yoshiharu Watanabe, Nagasaki (JP);
Tohru Houjyou, Nagasaki (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 100 days.

(21) Appl. No.: 09/637,704

(22) Filed: Aug. 15, 2000

(30) Foreign Application Priority Data

Aug. 23, 1999 (JP) ............................. 11-235329

(51) Int. Cl.$^7$ .............................. H01M 8/10; B05D 5/12
(52) U.S. Cl. .............................. 429/31; 429/34; 429/35; 429/36; 427/115
(58) Field of Search ................................. 429/31, 32, 30, 429/35, 36; 427/115

(56) References Cited

U.S. PATENT DOCUMENTS 5,336,570 A * 8/1994 Dodge et al. .................. 429/31
5,342,703 A * 8/1994 Kawasaki et al. ............. 429/30

FOREIGN PATENT DOCUMENTS

JP 08185882 * 7/1996 ............ H01M/8/12

* cited by examiner

Primary Examiner—Stephen Kalafut
Assistant Examiner—R Alejandro
(74) Attorney, Agent, or Firm—Birch, Stewart, Kolasch & Birch, LLP.

(57) ABSTRACT

A sealing structure of a cell tube for a tubular type fuel cell has a sealed portion composed of a conductive lead film formed on a surface of a substrate tube, and an airtight film with high airtight properties formed on a surface of the lead film. The sealing structure also has an adhesion enhancing film provided on a surface of the airtight film, and a sealing member adhered to a surface of the adhesion enhancing film via an inorganic adhesive coated on the surface of the adhesion enhancing film. Thus, the sealability of the cell tube is increased, and the electrical characteristics of the fuel cell are improved.

8 Claims, 7 Drawing Sheets

Sealing Film Configuration of Sinter Type Cell

Sealing Film Configuration of Thermal Spray Type Cell
(Earlier Technology)

Thermal Spraying Process

Sintering Process

SEALING STRUCTURE OF CELL TUBE

BACKGROUND OF THE INVENTION

1. Field of the Invention

This invention relates to a sealing structure of a cell tube of tubular type fuel cell, which increases sealability of the cell tube to enhance the electrical characteristics of the fuel cell.

2. Description of the Related Art

FIG. 3 outlines the structure of a tubular type solid electrolyte fuel cell module. FIG. 4 is a perspective schematic view of a cell tube portion of the module. FIG. 5 is a schematic structural view of a sealing structure at the end of the cell tube.

As shown in FIG. 3, a top plate 02, an upper tube sheet 03 and a lower tube sheet 04 are disposed in a module body 01 surrounded by a heat insulator. Below the lower tube sheet 04, a cell chamber 01a is formed. Between the top plate 02 and the upper tube sheet 03 of the module body 01, a fuel supply chamber 05 is formed. Between the upper tube sheet 03 and the lower tube sheet 04, a fuel discharge chamber 06 is formed. To the top plate 02 of the fuel supply chamber 05, an external pipe 07 for establishing communication between the fuel supply chamber 05 and the outside of the module body 01 is connected in such a manner as to pass through the module body 01. Inside of the external pipe 07, an internal pipe 08 passing through the upper tube sheet 03 is disposed for establishing communication between the fuel discharge chamber 06 and the outside of the module body 01.

Cell tubes 010, each comprising unit cell films (not shown) formed on an outer peripheral surface thereof, pass through and are supported by the lower tube sheet 04 such that the upper end of the cell tube 010 is positioned in the fuel discharge chamber 06, and that a lower portion of the cell tube 010 is positioned in the cell chamber 01a of the module body 01. Inside the cell tube 010, a fuel injection pipe 011 passing through the upper tube sheet 03 is disposed for establishing communication between the inner lower portion of the cell tube 010 and the interior of the fuel supply chamber 05. Inside the injection pipe 011, a current collecting rod 012 is disposed which has an upper end positioned in the fuel supply chamber 05 and a lower end positioned near the lower end of the cell tube 010. The lower end of the current collecting rod 012 is coupled to a current collecting member 013 which is electrically connected to the above-mentioned unit cell films and which closes the lower end of the cell tube 010. The upper end of the current collecting rod 012 is electrically connected to the outside of the module body 01 via a current collecting member 013 of nickel and a conductive rod 014.

To the upper end of the cell tube 010, a current collecting connector 015 electrically connected to the unit cell films is attached. The current collecting connector 015 is series connected to other cell tubes 01 via the same current collecting connectors 015.

In a lower portion of the cell chamber 01a of the module body 01, a partition plate 016 of a porous ceramic material is provided. Below the partition plate 016, an air preheating chamber 017 communicating with the cell chamber 01a via the partition plate 016 is provided. To the air preheating chamber 017, an air supply pipe 018 communicating with the outside of the module body 01 is connected. Inside the cell chamber 01a of the module body 01, an end of an air discharge pipe 019 is located. The air discharge pipe 019 has the other end located outside the module body 01, and its intermediate portion is disposed in such a manner as to pass through the interior of the air preheating chamber 017 for the purpose of heat exchange.

The cell tube 010 suspended from the lower tube sheet 04 of the module body 01, as shown in FIGS. 4 and 5, is formed by laminating a fuel electrode 032a, an electrolyte 032b, and an air electrode 032c in this order on a surface of a substrate tube 031, and further laminating a dense conductive connecting material (interconnector) 033 for connecting the fuel electrode and the air electrode. In this manner, a plurality of unit cell films 032 are formed in a lateral-striped pattern. That is, the unit cell film 032 is constituted by the fuel electrode 032a, the solid electrolyte 032b, and the air electrode 032c laminated on the substrate tube 031. The interconnectors 033 each seal the interface between the inside and the outside of the substrate tube 031 in the space between the unit cell films 032, thus connecting the unit cell films 032 in series.

The film configuration of a sealed portion of the foregoing cell tube 010 will be described with reference to FIGS. 5 and 6.

As shown in FIGS. 5 and 6, a lead film (Ni—Al) 034 connected via the interconnector 033 to the air electrode 032c and located on the outer surface of the substrate tube (15%CaO—$ZrO_2$) 031 is formed on the outer peripheral surface of a lower end portion of the substrate tube 031. The lead film 034 is provided with a current collecting terminal member 013, from which current is collected by the current collecting rod 012. On the upper surface of the lead film 034, an airtight film ($Al_2O_3$) 035 with high airtight properties is formed. A cap-like sealing member 037 is bonded to the airtight film 035 via an inorganic adhesive 036. A similar sealing structure is provided for the outer peripheral surface near the upper end, beside the aforementioned tube sheet 04, of the substrate tube 031. The airtight film 035 is minimally porous as indicated by its porosity of about 5 to 10%, and thus prevents an escape of gas. Moreover, the airtight film 035 has a relatively large thickness of about 100 to 150 $\mu$m to prevent oxidation of the lead film 034 located underneath.

The actions of the tubular type solid electrolyte fuel cell module with the foregoing structure will be described. The interior of the cell chamber 01a of the module body 01 is heated to an operating temperature (about 900 to 1,000° C.). A fuel gas 020 such as hydrogen is supplied through the external pipe 07, while air 021 as an oxidant gas is supplied through the air supply pipe 018. The fuel gas 020 fed through the external pipe 07 flows from the fuel supply chamber 05 to the lower end of the cell tube 010 via the injection pipe 011. On the other hand, the air 021 that has passed through the partition plate 016 via the air preheating chamber 017 flows into the cell chamber 01a. The fuel gas 020 permeates through the porous substrate tube 031, and is fed to the fuel electrode 032a of the unit cell film 032. Whereas the air (oxygen) 021 contacts the air electrode 032c. At this time, the unit cell film 032 reacts the hydrogen and the air (oxygen) electrochemically to generate power. This power is transmitted to the outside via the current collecting member 013, current collecting rod 012, current collecting member 013, and conductive rod 014. A residual fuel gas 022 remaining after power generation flows into the fuel discharge chamber 06 from the upper end of the cell tube 010, and is discharged to the outside via the internal pipe 08 for reuse. Residual air 023 remaining after power generation is discharged to the outside via the air discharge pipe 019.

The above-described cell tube 010 has so far been laborious to produce, because the fuel electrode 032a, electrolyte 032b, and air electrode 032c are sequentially formed as films on the surface of the substrate tube 031 by means of a thermal spray gun 040 as shown in FIG. 7(A). Moreover, there has been a raw material loss 041 during film formation owing to the spraying of raw materials from the thermal spray gun 040, and the production cost has been high. Thus, a low cost for mass production has been desired.

Under these circumstances, a proposal has been made for a sintering process performed by forming films of raw materials for the fuel electrode, etc. sequentially on the surface of the substrate tube 031, followed by sintering films 042 thereon, as shown in FIG. 7(B). However, an airtight film of a cell tube obtained by the sintering process, as compared with that obtained by the thermal spraying process, has few asperities on the surface because of the sintering action. As a result, the airtight film is poorly sealable with the sealing member when sealed via an adhesive. The reason behind this phenomenon is as follows: As shown in FIG. 6, the airtight film 035 obtained by the conventional thermal spraying process comprises coarse particles, and has surface roughness of about 10 to 15 $\mu$m, thus ensuring satisfactory sealability with the adhesive. By contrast, the airtight film obtained by the sintering process has very low surface roughness of about 2 to 5 $\mu$m because of the sintering action. Consequently, adhesion to the adhesive is not satisfactory, and may result in a leak.

SUMMARY OF THE INVENTION

In light of the above-described problems, the present invention aims to provide a sealing structure of a sinter type cell tube for a tubular type fuel cell, the sealing structure designed to increase the sealability of the cell tube, thereby enhancing the electrical characteristics of the fuel cell.

A first aspect of the invention is a sealing structure of a cell tube for a fuel cell, the cell tube comprising a unit cell film prepared by forming a fuel electrode and an air electrode as films on a surface of a substrate tube for the fuel cell by a sintering process, with a solid electrolyte being interposed between the fuel electrode and the air electrode, wherein:

an adhesion enhancing film having a predetermined roughness characteristic is included in a sealed portion of the cell tube between an air tight film and a sealing member.

Thus, adhesion to the adhesive can be enhanced to decrease a gas leak. Furthermore, formation of the cell tube by the sintering process results in a marked increase in the utilization factor of the raw materials, as compared with the thermal spraying process. Besides, the production facilities are simpler with the sintering process. Thus, the equipment cost and the production cost can be reduced markedly.

In the first aspect of the invention, the sealed portion of the cell tube may be composed of a conductive lead film formed on the surface of the substrate tube, and an airtight film with high airtight properties formed on a surface of the lead film;

the adhesion enhancing film is located on a surface of the airtight film; and a sealing member is formed on a surface of the adhesion enhancing film via an adhesive coated on the surface of the adhesion enhancing film.

Thus, adhesion to the adhesive is enhanced to decrease a gas leak.

In the first aspect of the invention, the adhesion enhancing film includes a rough surface with surface roughness characteristic of 10 $\mu$m or more. Thus, adhesion to the adhesive is enhanced to decrease a gas leak.

In the first aspect of the invention, the adhesion enhancing film has a porosity of 5 to 30%. Thus, adhesion to the adhesive is enhanced to decrease a gas leak.

In the first aspect of the invention, the adhesion enhancing film comprising a film of, or a mixture of, $CaTiO_3$, $MgAl_2O_4$, calcia-stabilized zirconia, and yttria-stabilized zirconia. Thus, adhesion to the adhesive is enhanced to decrease a gas leak.

In the first aspect of the invention, the adhesion enhancing film has a film thickness of 20 to 30 $\mu$m. Thus, adhesion to the adhesive is enhanced to decrease a gas leak.

The airtight film has a porosity of 3% or less. Thus, the gas barrier properties of the film is improved. Moreover, adhesion to the adhesive is enhanced to decrease a gas leak.

The airtight film has a film thickness of 60 to 100 $\mu$m. Thus, the gas barrier properties of the film is further improved. Moreover, adhesion to the adhesive is enhanced to decrease a gas leak.

A second aspect of the invention is a tubular type solid electrolyte fuel cell module which supplies an oxidant gas and a fuel gas to a cell tube comprising a unit cell film formed on an outer peripheral surface thereof in a cell chamber in an environment at an operating temperature, to react the oxidant gas and the fuel gas electrochemically, thereby obtaining a power, wherein:

the above-described sealing structure of a cell tube for a fuel cell is used.

This module adopts a fuel cell system with markedly increased sealability. Thus, there is an increase in the utilization factor of residual fuel in a bottoming cycle of a gas turbine or the like. Consequently, an improvement is achieved in the electrical efficiency of a fuel cell combined power generation system using a gasification furnace, etc.

A third aspect of the invention is a method for producing a cell tube for a fuel cell, comprising:

forming an adhesion enhancing film by a sintering process simultaneously with forming a fuel electrode and an electrolyte as films on a substrate tube by sintering; and then forming an air electrode by sintering.

Thus, the adhesion enhancing film achieving a decrease in the gas leak is formed.

A fourth aspect of the invention is a method for producing a cell tube for a fuel cell, comprising:

forming a fuel electrode and an electrolyte as films on a substrate tube by sintering; and then forming an adhesion enhancing film by sintering simultaneously with the forming of an air electrode as a film also by sintering.

Thus, a denser adhesion enhancing film achieving a decrease in the gas leak is formed.

A fifth aspect of the invention is a method for producing a cell tube for a fuel cell, comprising:

forming an adhesion enhancing film by sintering simultaneously with the forming of a fuel electrode, an electrolyte, and an air electrode as films on a substrate tube also by sintering.

Thus, the unit cell film and the adhesion enhancing film is formed simultaneously by a single sintering step. This is an efficient method.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 7(A) and FIG. 7(B) are schematic views of film-forming methods, in which FIG. 7(A) shows a thermal spraying process, and FIG. 7(B) a sintering process.

DETAILED DESCRIPTION OF THE PREFERRED EMBODIMENTS

Preferred embodiments of the present invention will now be described, but it should be understood that the invention is not restricted thereby.

Figure 1:
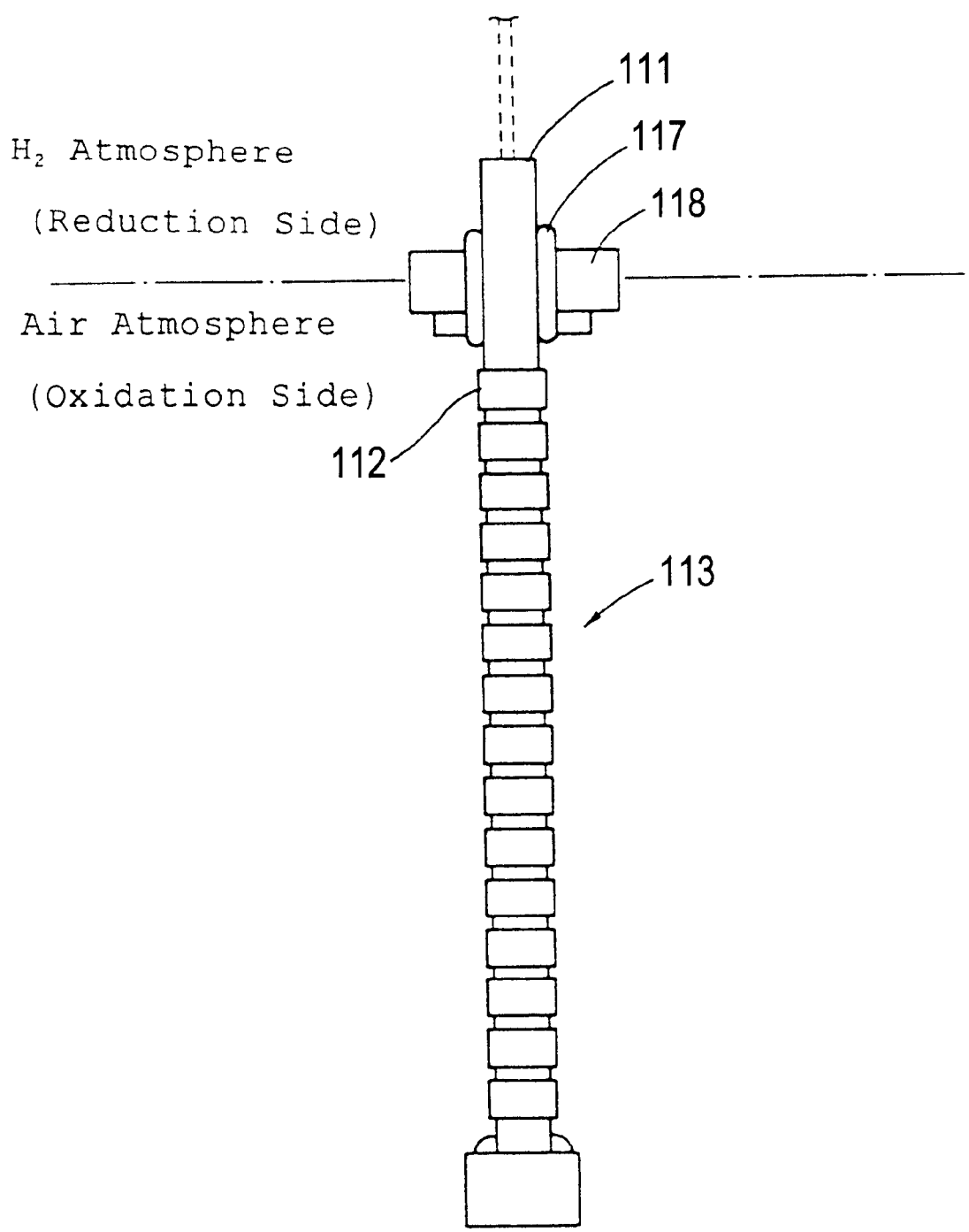
FIG. 1 is a schematic view showing an example of a sealing structure of a cell tube according to an embodiment of the invention.
Figure 2:
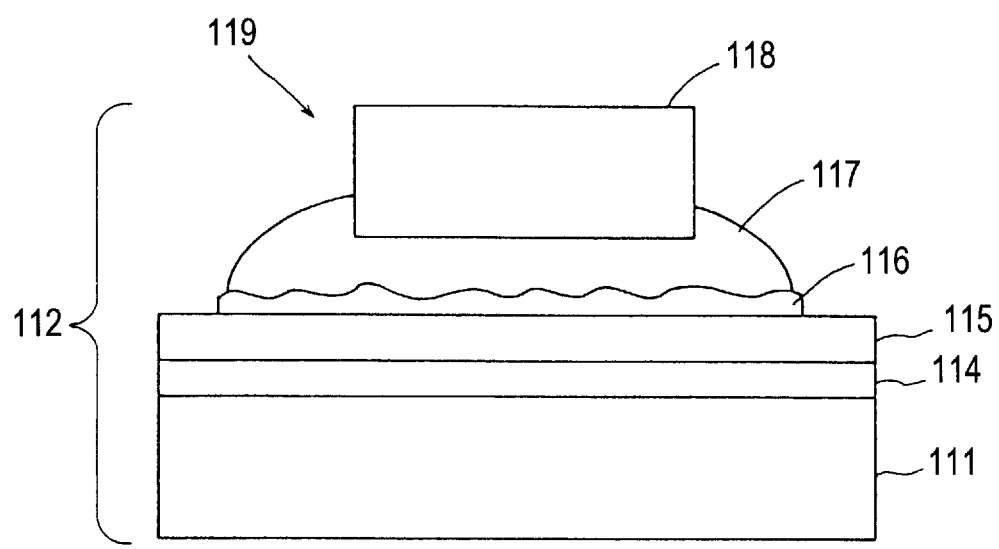
FIG. 2 is a detail drawing of the sealing structure prepared by a sintering process according to the embodiment of the invention.
Figure 7:
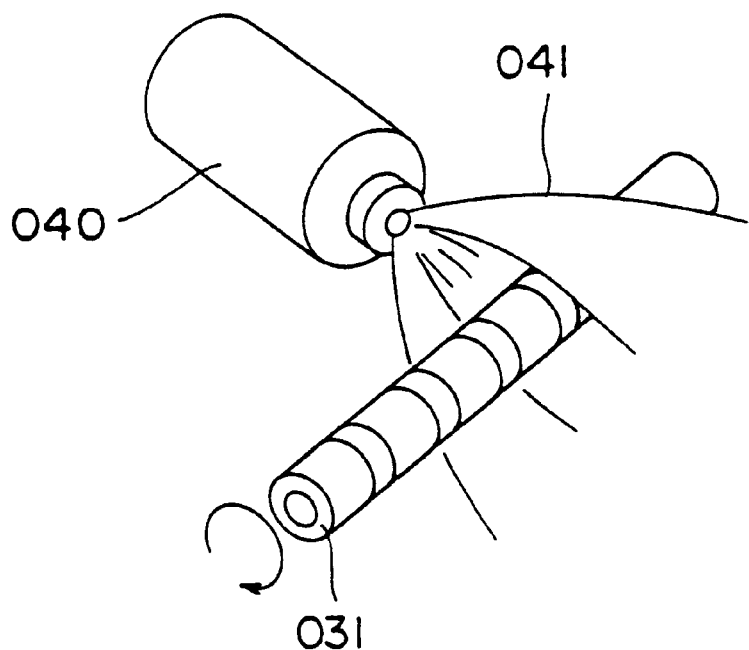
Figure 7:
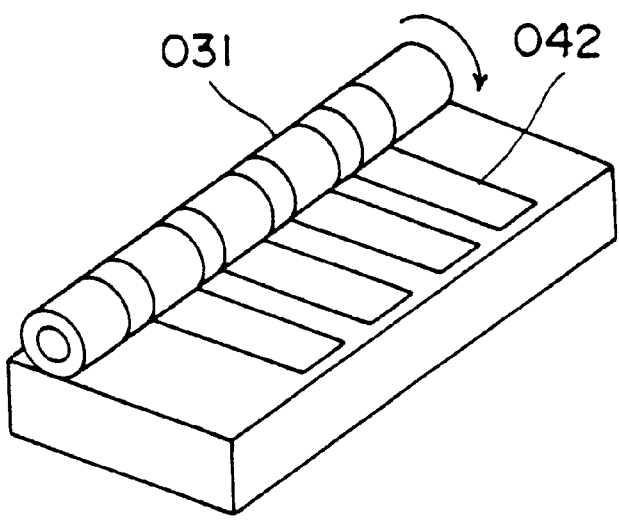

FIG. 1 is a schematic view showing an example of a sealing structure of a cell tube according to an embodiment of the invention. FIG. 2 is a detail view of the sealing structure formed by a sintering process such as shown in FIG. 7(B).

Figure 4:
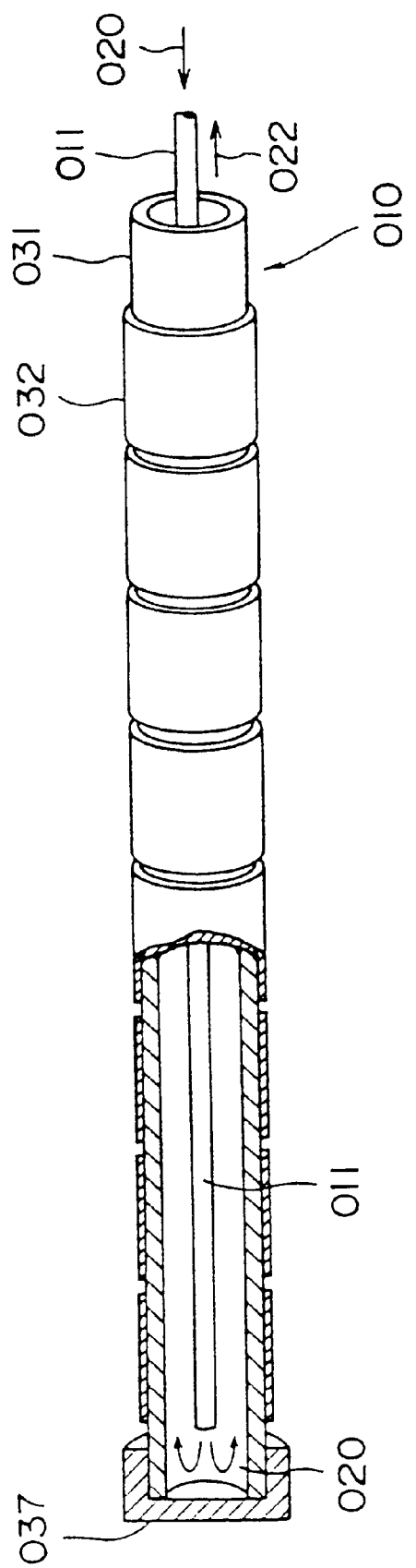
FIG. 4 is a perspective schematic view of a cell tube portion of the module.

FIGS. 1 and 2 show a cell tube 113 having unit cell films 112 on a surface of a substrate tube 111 for a fuel cell similar to that shown in FIGS. 4 and 5, (hereinafter referred to as "a substrate tube"), each of the unit cell films 112 being constructed by forming a fuel electrode and an air electrode, with a solid electrolyte being interposed between the fuel electrode and the air electrode as shown, for example, in FIG. 5. An adhesion enhancing film having a relatively large predetermined surface roughness is provided on a sealed portion 119 of the cell tube 113 shown in FIG. 1. As shown in FIG. 2, the sealed portion 119 of the cell tube 113 is composed of a conductive lead film (e.g., Ni—$ZrO_2$) 114 formed on the surface of the substrate tube (e.g., 15%CaO—$ZrO_2$) 111, and an airtight film (e.g., 8%$Y_2O_3$—$ZrO_2$) 115 with high airtight properties formed on the surface of the lead film 114. On the surface of the airtight film 115 is located, an adhesion enhancing film 116. The outer surface of the adhesion enhancing film 116 is coated with an inorganic adhesive 117 and a sealing member 118 is adhered to the adhesion enhancing film 116.

The adhesion enhancing film 116 preferably has a rough outer surface with surface roughness characteristic of 10 $\mu$m or more. If the surface roughness is less than 10 $\mu$m, the adhesion between the adhesion enhancing film 116 and the adhesive 117 decreases, and may cause a gas leak. The upper limit of the surface roughness is not restricted, but is preferably less than 700 $\mu$m as will be shown in the Examples to be subsequently described. The porosity of the adhesion enhancing film 116 is preferably 5 to 30%. If the porosity is less than 5%, the adhesion decreases, and leakage increases. If the porosity exceeds 30%, on the other hand, the strength of the film 116 decreases.

With respect to the material for the adhesion enhancing film 116, a material having the following properties (1) to (3) is preferably selected:

(1) A Film Resistant to Oxidation and Reduction

On a side where the cell tube 113 is suspended, the sealed portion 119 (FIG. 2) including the substrate tube 111 is exposed to both of an oxidizing atmosphere and a reducing atmosphere as shown in the upper portion of FIG. 1, and thus needs to be prevented from deterioration.

(2) A Film 116 not Reactive to the Underlying Airtight Film 115

The adhesion enhancing film 116 needs to be prevented from deterioration by reacting with the airtight film 115 underneath.

(3) Making an Adhesion Enhancing Film 116 which is Similar in Thermal Expansion Coefficient to that of the Substrate Tube 111

As power generation by the fuel cell tube 113 is repeated, cracking by repetition of temperature raising and lowering needs to be prevented because the temperature during power generation becomes as high as about 900° C.

A material for the adhesion enhancing film 116 having the above properties includes, for example, a film of $CaTiO_3$, $MgAl_2O_4$, calcia-stabilized zirconia (CSZ), and yttria-stabilized zirconia (YSZ), or a mixture of them. However, a material usable in the subject invention is not restricted to these foregoing examples, as long as it has the above-mentioned properties.

The thickness of the adhesion enhancing film 116 has a thickness so as to permit satisfactory coating of the adhesive 117. For example, the preferred thickness is 20 to 30 $\mu$m.

The porosity of the airtight film 115 is set at 3% or less in order to prevent an escape of gas and prevent oxidation of the lead film 114 underneath. Since the porosity of the airtight film 115 is 3% or less, its film thickness is preferably 60 to 100 $\mu$m. That is, an airtight film 115 formed by the conventional thermal spraying process such as shown, for example, in FIG. 7(A) has high porosity (5 to 10%), thus requiring a film thickness of about 100 to 150 $\mu$m. On the other hand, an airtight film 115 formed by a sintering process such as shown, for example, in FIG. 7(B) is dense, and thus its film thickness can be decreased to about two-thirds of the film thickness of a conventional airtight film, for example the unit cell film 032 shown in FIG. 5. The material for the airtight film 115 comprises any material which forms a dense film having low porosity. For example, $Al_2O_3$ and yttria-stabilized zirconia (YSZ) can be used.

As noted above, the thickness of the airtight film 115 may be 60 to 100 $\mu$m, and the thickness of the adhesion enhancing film 116 may be 20 to 30 $\mu$m. Thus, the resulting composite film 116 has a total film thickness smaller than the thickness of the airtight film 032 (FIG. 5) formed by the conventional thermal spraying process. In addition, since a sintering process is employed, there can be provided a sealing structure decreased in production cost and raw materials cost, having satisfactory gas barrier properties, and ensuring high adhesion to the adhesive 117.

Production Examples (1) to (3) for a cell tube 113 such as shown in FIG. 1 and having a sealing structure formed by sintering will now be described.

Figure 5:
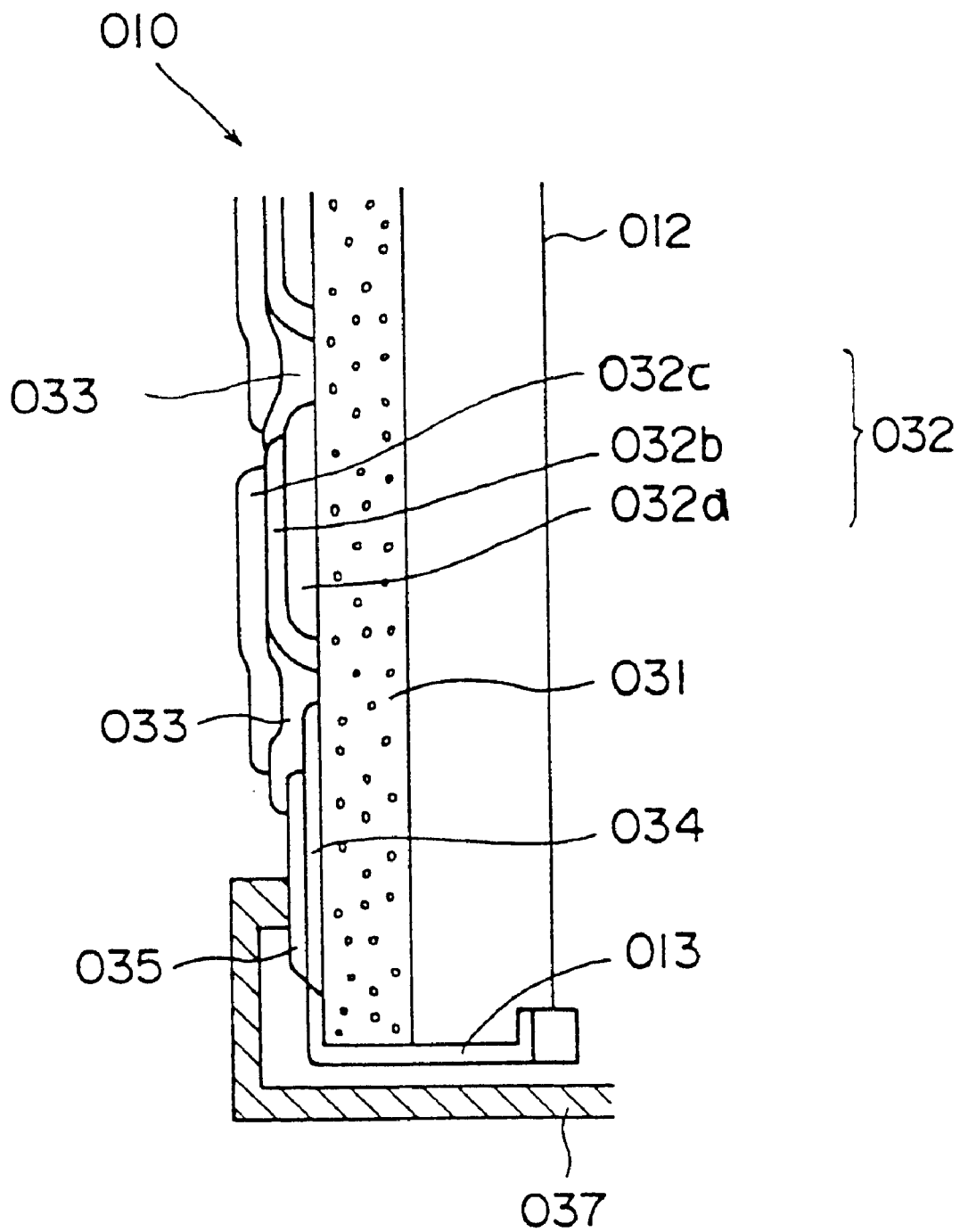
FIG. 5 is a schematic structural view of a sealing structure in an end portion of the cell tube.
Figure 6:
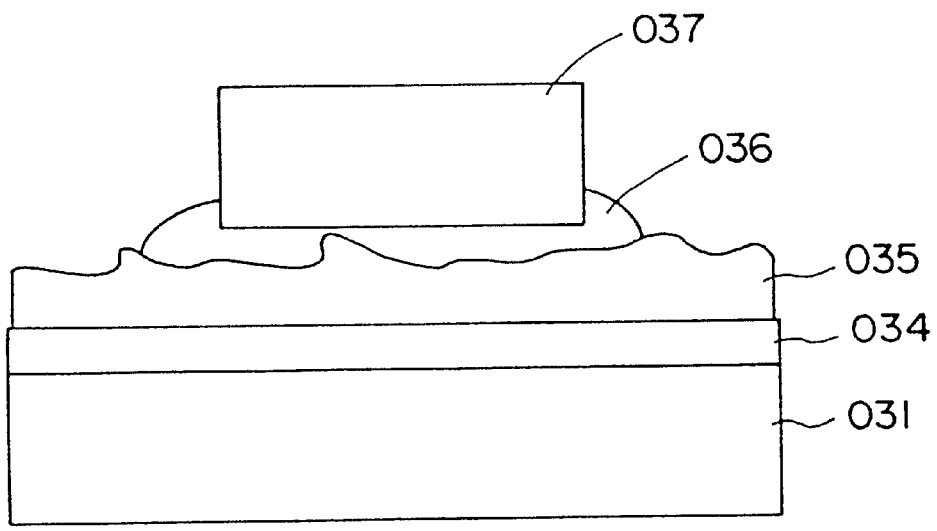
FIG. 6 is a detail view of a sealing structure prepared by a thermal spraying process according to related art.

(1) The First Method is for the Production of a Sealing Structure 112 such as Shown in FIG. 2 by a Two-stage Film Formation Accordingly, when a fuel electrode and an electrolyte, such as shown in FIG. 5 by reference numerals 032a and 032b, are formed as films on a substrate tube 111 (FIG. 2) by the sintering process shown in FIG. 7(B), an adhesion enhancing film 116 is simultaneously formed thereon in a first sintering step. Then, an air electrode 032c is formed as a film by a second sintering step.

(2) The Second Method is for the Production of a Sealing Structure 112 such as Shown in FIG. 2 also by Two-stage Film Formation Thus, after a fuel electrode 032a and an electrolyte 032b are formed as films on a substrate tube 111 by a first step of a sintering process shown in FIG. 7(B), an air electrode 032c is formed as a film by a second sintering step. Simultaneously with formation of the air electrode film 032c during the second sintering step, an adhesion enhancing film 116 is formed by the sintering process. According to this method of film formation, the sintering temperature of the air electrode during the second step is higher than the temperature at the first step. Thus, a denser airtight film can be formed.

(3) The Third Method is for the Production of a Sealing Structure 112 by a One-stage Single Step Film Formation Accordingly, when a fuel electrode 032a, an electrolyte 032b, and an air electrode 032c are formed as films on a substrate tube 111 by the sintering process shown in FIG. 7(B), an adhesion enhancing film 116 is simultaneously formed by the sintering process in the same step. This film formation is efficient, because a single sintering step forms a unit cell film 032 and the adhesion enhancing film 116 simultaneously.

Figure 3:
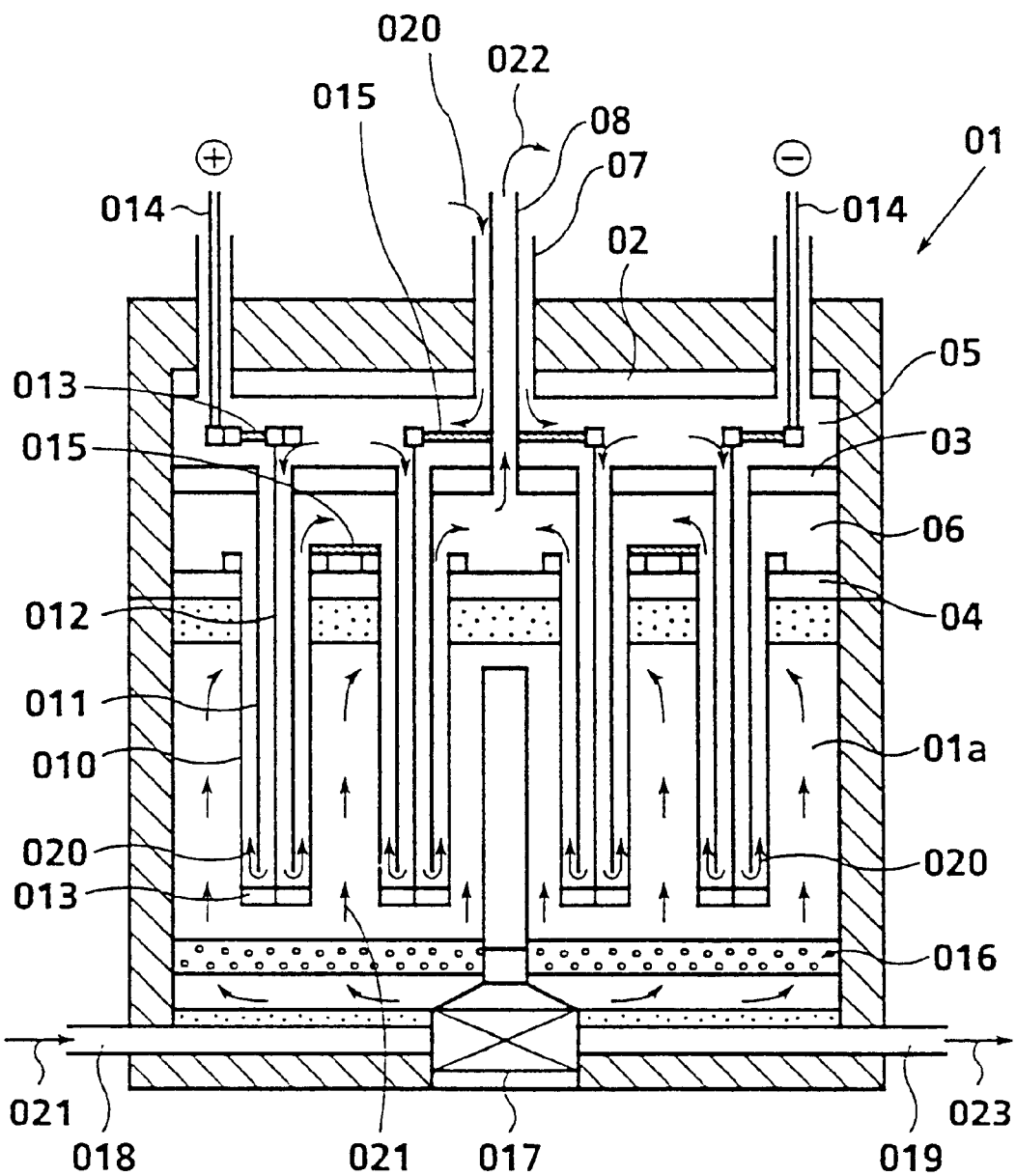
FIG. 3 is a schematic structural view of a tubular type solid electrolyte fuel cell module.

A cell tube 113 having the above-described sealing structure as shown in FIG. 2 is built into a tubular type solid electrolyte fuel cell module as illustrated in FIG. 3. By so doing, a fuel leak is markedly decreased, so that satisfactory power generation by the fuel cell module 01 can be performed for a long term.

As discussed above, the use of a sintering process markedly increases the utilization factor of the raw materials, as compared with the thermal spraying process. Besides, the sintering process involves simpler production facilities. Thus, the equipment cost and the production cost can be reduced markedly. Furthermore, the fuel cell module 01 using the cell tube 112 produced by the sintering process adopts a fuel cell system with markedly increased sealability. Thus, there is an increase in the utilization factor of the residual fuel in a bottoming cycle of a gas turbine or the like. Consequently, an improvement can be achieved in the electrical efficiency of a fuel cell combined power generation system using a gasification furnace, etc.

EXAMPLES

The effects of present invention will be described in more detail with reference to the following Examples, which, however, in no way limit the invention.

The composition, porosity, and surface roughness of the adhesion enhancing film 116 of the sealing structure shown in FIG. 2 are set forth in Table 1. Under these conditions, the fuel leak (%) was measured.

Examples 1 to 5, Comparative Examples 1 to 4

The ratio between $CaTiO_3$ and $MgAl_2O_4$ as the materials for the film was set at 1:1, while the porosity and the surface roughness were variously varied as shown in Table 1. Under these conditions, the fuel leak (%) was measured.

Examples 6 and 7

The ratio between $CaTiO_3$ and $MgAl_2O_4$ as the materials for the film was changed to be 3:7 and 7:3. Under these conditions, the fuel leak (%) was measured.

Example 8

8 mol %$Y_2O_3$—$ZrO_2$ was used as the material for the film, and the porosity and the surface roughness as shown in Table 1 were employed. Under these conditions, the fuel leak (%) was measured.

Examples 9 and 10

The ratio between $CaTiO_3$ and 15 mol %CaO—$ZrO_2$ as the materials for the film was changed to be 2:8 and 3:7. Under these conditions, the fuel leak (%) was measured.

The results are shown in Table 1.

TABLE 1

| | Composition (vol. %) | | | | film porosity (%) | Surface roughness (m) | Fuel leak (%) |
|---|---|---|---|---|---|---|---|
| | $CaTiO_3$ | $MgAl_2O_4$ | 8 mol % $Y_2O_3$—$ZrO_2$ | 15 mol % CaO—$ZrO_2$ | | | |
| Ex. 1 | 50 | 50 | | | 5 | 100 | 5 |
| Ex. 2 | 50 | 50 | | | 20 | 100 | 3 |
| Ex. 3 | 50 | 50 | | | 30 | 100 | 4 |
| Ex. 4 | 50 | 50 | | | 20 | 10 | 5 |
| Ex. 5 | 50 | 50 | | | 20 | 500 | 4 |
| Comp. Ex. 1 | 50 | 50 | | | 3 | 100 | 20 |
| Comp. Ex. 2 | 50 | 50 | | | 40 | 100 | 15 |
| Comp. Ex. 3 | 50 | 50 | | | 20 | 5 | 18 |
| Comp. Ex. 4 | 50 | 50 | | | 20 | 700 | 13 |
| Ex. 6 | 30 | 70 | | | 20 | 100 | 4 |
| Ex. 7 | 70 | 30 | | | 20 | 100 | 5 |
| Ex. 8 | | | 100 | | 20 | 100 | 4 |
| Ex. 9 | 20 | | | 80 | 20 | 100 | 3 |
| Ex. 10 | 30 | | | 70 | 20 | 100 | 4 |

Table 1 shows that the fuel leak was very small in Examples 1 to 10 using the parameters within the ranges of the present invention. When the film porosity was 3% and 40% as in Comparative Examples 1 and 2, by contrast, the fuel leak was as great as 20% and 15%, respectively. When the surface roughness was 5 μm and 700 μm, the fuel leak was also as high as 18% and 13%, respectively.

While the present invention has been described in the foregoing fashion, it is to be understood that the invention is not limited thereby, but may be varied in many other ways. Such variations are not to be regarded as a departure from the spirit and scope of the invention, and all such modifications as would be obvious to one skilled in the art are intended to be included within the scope of the appended claims.

The entire disclosure of Japanese Patent Application No. 1999/235329 filed on Aug. 23, 1999 including specification, claims, drawings and summary is incorporated herein by reference in its entirety.

What is claimed is:

1. A sealing structure of a cell tube for a fuel cell, comprising: a cell tube having a sealed portion and including a substrate tube and a unit cell film member, further comprising a fuel electrode and an air electrode formed as films by a sintering process on a surface of the substrate tube and a solid electrolyte being interposed between the fuel electrode and the air electrode, and wherein an adhesion film including a surface having a predetermined roughness characteristic for adhesion thereof to a sealing member is located on the sealed portion of the cell tube, the sealed portion of the cell tube further including a conductive lead film formed on the surface of the substrate tube, and a film having airtight properties formed on a surface of the lead film, wherein the adhesion film is located on a surface of the film having airtight properties, and wherein the sealing member is adhered to the surface of the adhesion film via an adhesive coated on the surface of the adhesion film having said predetermined roughness characteristic.

2. A sealing structure of a cell tube for a fuel cell as claimed in claim 1, wherein:

the surface of the adhesion film having a predetermined roughness characteristic has a surface roughness of 10 $\mu$m or more.

3. A sealing structure of a cell tube for a fuel cell as claimed in claim 1, wherein:

the adhesion film has porosity of 5 to 30%.

4. A sealing structure of a cell tube for a fuel cell as claimed in claim 1, wherein:

the adhesion film comprises a film of, or a mixture of, $CaTiO_3$, $MgAl_2O_4$, calcia-stabilizer zirconia, and yttria-stabilized zirconia.

5. A sealing structure of a cell tube for a fuel cell as claimed in claim 1, wherein:

the adhesion film has a film thickness of 20 to 30 $\mu$m.

6. A sealing structure of a cell tube for a fuel cell as claimed in claim 1, wherein:

the film having airtight properties has porosity of 3% or less.

7. A sealing structure of a cell tube for a fuel cell as claimed in claim 1, wherein:

the film having airtight properties has film thickness of about 60 $\mu$m to about 100 $\mu$m.

8. A sealing structure as claimed in any one of claims 1 to 7 wherein said fuel cell comprises a solid electrolyte fuel cell module which supplies an oxidant gas and a fuel gas to the cell tube, and wherein said unit cell film member is formed on an outer peripheral surface of the cell tube in a cell chamber located in an environment having a predetermined operating temperature, so as to cause the oxidant gas and the fuel gas to react electrochemically, thereby generating power.

* * * * *